US012662031B2

(12) United States Patent
Kim et al.

(10) Patent No.: US 12,662,031 B2
(45) Date of Patent: Jun. 23, 2026

(54) REAR SEAT APPARATUS FOR VEHICLE

(71) Applicants: Hyundai Motor Company, Seoul (KR); Kia Corporation, Seoul (KR); DAS CO., LTD, Gyeongju (KR)

(72) Inventors: Mu Young Kim, Osan (KR); Hee Dong Choi, Hwaseong (KR); Soo Hyun Moon, Hwaseong (KR); Wan Su Park, Gwacheon (KR); Gil Ju Kim, Hwaseong (KR); Seok Ju Gim, Seongnam (KR); Kyoung Su Oh, Cheonan (KR); Jae Hong Bae, Ulsan (KR); Dong Hyeon Kim, Hwaseong (KR); Yong Tak Han, Suwon (KR); Sung Wook Lee, Bucheon (KR); Yong Sun Oh, Ulsan (KR); Kyu Hee Lee, Ulsan (KR)

(73) Assignees: Hyundai Motor Company, Seoul (KR); Kia Corporation, Seoul (KR); DAS CO., LTD, Gyeongsangbuk-do (KR)

( * ) Notice: Subject to any disclaimer, the term of this patent is extended or adjusted under 35 U.S.C. 154(b) by 188 days.

(21) Appl. No.: 18/416,146

(22) Filed: Jan. 18, 2024

(65) Prior Publication Data

US 2025/0091493 A1 Mar. 20, 2025

(30) Foreign Application Priority Data

Sep. 15, 2023 (KR) ........................ 10-2023-0123460

(51) Int. Cl.
B60N 2/68 (2006.01)
B60N 2/07 (2006.01)
B60N 2/14 (2006.01)

(52) U.S. Cl.
CPC ............... B60N 2/682 (2013.01); B60N 2/07 (2013.01); B60N 2/143 (2013.01)

(58) Field of Classification Search
CPC ........ B60N 2/143; B60N 2/203; B60N 2/242; B60N 2/3056; B60N 2/7047; B60N 2/7094; B60N 2002/0212
See application file for complete search history.

(56) References Cited

U.S. PATENT DOCUMENTS 1,539,764 A * 5/1925 Page ................... B60N 2/3015
296/37.16
6,328,379 B1 * 12/2001 Merrick ............... B60N 2/4221
297/216.1
(Continued)

FOREIGN PATENT DOCUMENTS

DE 102010014526 A1 * 11/2010 ........... B60N 2/3056
DE 102012008166 A1 * 6/2013 ............... B60N 2/64
(Continued)

*Primary Examiner* — Timothy J Brindley
(74) *Attorney, Agent, or Firm* — Fox Rothschild LLP

(57) ABSTRACT

A rear seat apparatus for a vehicle includes a back frame and a cushion frame. The back frame is not interlocked with the cushion frame and is individually rotated in the forward-and-rearward direction independently of the cushion frame. The cushion frame is not interlocked with the back frame and individually slides in the forward-and-rearward direction independently of the back frame. A front seating state and a rear seating state of a passenger are implemented through individual sliding movement of the cushion frame in the forward-and-rearward direction.

15 Claims, 10 Drawing Sheets

(56) References Cited

U.S. PATENT DOCUMENTS

| | | | | |
|---|---|---|---|---|
| 7,090,300 B2 * | 8/2006 | Fujita | .................... | B60N 2/7094 |
| | | | | 297/452.56 |
| 7,600,821 B2 * | 10/2009 | Yasuda | ................ | B60N 2/7094 |
| | | | | 297/452.56 |
| 8,100,478 B2 * | 1/2012 | Ellison | ................. | B60N 2/3013 |
| | | | | 297/341 |
| 8,702,146 B1 * | 4/2014 | Mather | ................ | B60N 2/3031 |
| | | | | 296/65.01 |
| 11,059,396 B2 * | 7/2021 | Zhao | ...................... | B60N 2/203 |
| 11,174,893 B1 * | 11/2021 | Freer | .......................... | F16C 1/16 |
| 11,618,354 B2 * | 4/2023 | Glaub | ................... | B60N 2/502 |
| | | | | 297/216.1 |
| 11,731,547 B2 * | 8/2023 | Kim | ......................... | B60N 2/02 |
| | | | | 297/423.26 |
| 11,872,913 B1 * | 1/2024 | Boyd | ..................... | B60N 2/072 |
| 11,919,427 B2 * | 3/2024 | Vetere, II | ................. | B60N 2/203 |
| 12,103,441 B2 * | 10/2024 | Jeong | ....................... | B60N 2/36 |

FOREIGN PATENT DOCUMENTS

| | | | | | |
|---|---|---|---|---|---|
| KR | 10-2012-0063371 A | | 6/2012 | | |
| WO | WO-2014170123 A1 * | 10/2014 | | ........... | B60N 2/0224 |
| WO | WO-2024010836 A1 * | 1/2024 | | ........... | B60N 2/3065 |

* cited by examiner

FIG. 1

FRONT
SIDE

FIG. 5

REAR SEAT APPARATUS FOR VEHICLE

CROSS-REFERENCE TO THE RELATED APPLICATION

This application claims under 35 U.S.C. § 119(a) the benefit of Korean Patent Application No. 10-2023-0123460, filed on Sep. 15, 2023 in the Korean Intellectual Property Office, the entire contents of which are incorporated herein by reference.

BACKGROUND

1. Technical Field

The present disclosure relates to a rear seat apparatus for a vehicle, more particularly, to the rear seat apparatus configured to individually perform a reclining operation of a seatback and a sliding operation of a seat cushion.

2. Description of the Related Art

In general, there are many different types of passenger vehicles, and examples of a vehicle include a sport utility vehicle (SUV), a multi-purpose vehicle (MUV), and the like, and such a vehicle has a function of storing cargo using an interior space thereof in addition to a passenger boarding function.

In order to store cargo in the interior space of a vehicle, it is necessary to secure space by moving and rotating rear seats of the vehicle (which may include the second and third row seats) excluding the first row seats including a driver seat and a passenger seat.

To this end, the rear seats may have a walk-in function, a fold-and-dive function, and a swivel function.

However, the conventional rear seat has a configuration in which a seatback is operated while being interlocked with a seat cushion during a walk-in operation, a fold-and-dive operation, or a swivel operation, which may cause a complicated configuration and an increase in costs.

In addition, since a swivel device is mounted under the seat cushion, it is disadvantageous in securing an installation space, and particularly, there is a drawback in that it is necessary to secure a space for rotation of the seatback and the seat cushion.

The information disclosed in this Background section is only for enhancement of understanding of the general background of the disclosure, and should not be taken as an acknowledgement or any form of suggestion that this information forms the related art already known to a person skilled in the art.

SUMMARY

Therefore, the present disclosure provides a rear seat apparatus for a vehicle configured to individually perform a reclining operation of a seatback and a sliding operation of a seat cushion. The rear seat apparatus simplifies a configuration thereof and reduces costs as compared with a seat configuration in which a seatback is interlocked with a seat cushion. Particularly, the rear seat apparatus may secure seating comfort of a passenger in consideration of the body type of each passenger through individual sliding movement of the seat cushion, thereby improving ride quality of a vehicle.

It is another object of the present disclosure to provide the rear seat apparatus configured to implement a swivel function of an existing seat through individual sliding movement of the seat cushion, thereby making it possible to reduce costs and more reliably secure an interior space.

It is a further object of the present disclosure to provide the rear seat apparatus configured to secure, through individual sliding movement of the seat cushion, a sufficient loading space for cargo such as goods, items, and the like on the front and rear sides of the seat. According to this configuration, utilization of the interior space may be further improved.

In accordance with the present disclosure, the above and other objects can be accomplished by the provision of a rear seat apparatus for a vehicle, including a pair of side frames fixedly coupled to a vehicle body, a back frame fixedly coupled to a left side of one of the side frames and a right side of the other side frame, a pair of moving frames, wherein each of the moving frames is coupled to a corresponding one of the side frames and is configured to slide forwards and rearwards along the side frame, and a cushion frame coupled to the moving frame and configured to individually slide forwards and rearwards independently of the back frame.

The pair of side frames may be spaced apart left and right.

The cushion frame preferably is separated from the back frame.

The back frame may have a recliner provided therein, wherein the recliner may be operated so as to allow the back frame to be individually rotated without being interlocked with the cushion frame.

The rear seat apparatus may further include a seat rail located below the cushion frame and formed to extend forwards and rearwards, and a connecting member configured to connect the seat rail to the cushion frame.

The seat rail may be formed of a long rail and may be electrically operated, wherein a length of the long rail in a forward-and-rearward direction may be longer than a length of the cushion frame in the forward-and-rearward direction.

The connecting member may be formed as a monopost type configured to connect the seat rail to one portion of the cushion frame.

The cushion frame may include a cushion pan configured to support a lower body of a passenger, and the cushion pan may have a front end fixedly coupled to a center cross bar of the cushion frame and a rear end connected to a rear cross bar of the cushion frame through a plurality of springs.

The rear end of the cushion pan may move downwards by tension of the springs when the passenger is seated on the cushion pan, and the front end of the cushion pan may support lower extremities of the passenger so as to prevent occurrence of submarine effect in the event of vehicle collision.

When the cushion frame slides forwards so as to protrude forwards with respect to the back frame, a passenger may be allowed to be seated toward a front side.

When the cushion frame slides rearwards so as to protrude rearwards with respect to the back frame, a passenger may be allowed to be seated toward a rear side.

The back frame may provide, when the cushion frame slides rearwards so as to protrude rearwards with respect to the back frame, a space secured on a front side thereof, wherein the space may be usable to load an object therein.

The back frame may provide, when the cushion frame slides forwards so as to protrude forwards with respect to the back frame and then the back frame is rotated forwards to be folded, a space secured on an upper side thereof and a space secured on a rear side thereof, wherein the spaces may be usable to load an object therein.

A vehicle seat may include the rear seat apparatus.

A vehicle may include the vehicle seat apparatus.

As referred to herein, a monopost seat assembly or monopost seat or other similar term refers to a captain's-type vehicle seat rather than a bench-type vehicle seat or seat assembly. In certain aspects, a monopost vehicle seat may not have a seat-collapsing hinge as provided with a bench-type vehicle seat.

BRIEF DESCRIPTION OF THE DRAWINGS

The above and other objects, features and other advantages of the present disclosure will be more clearly understood from the following detailed description taken in conjunction with the accompanying drawings, in which:

Figure 1:
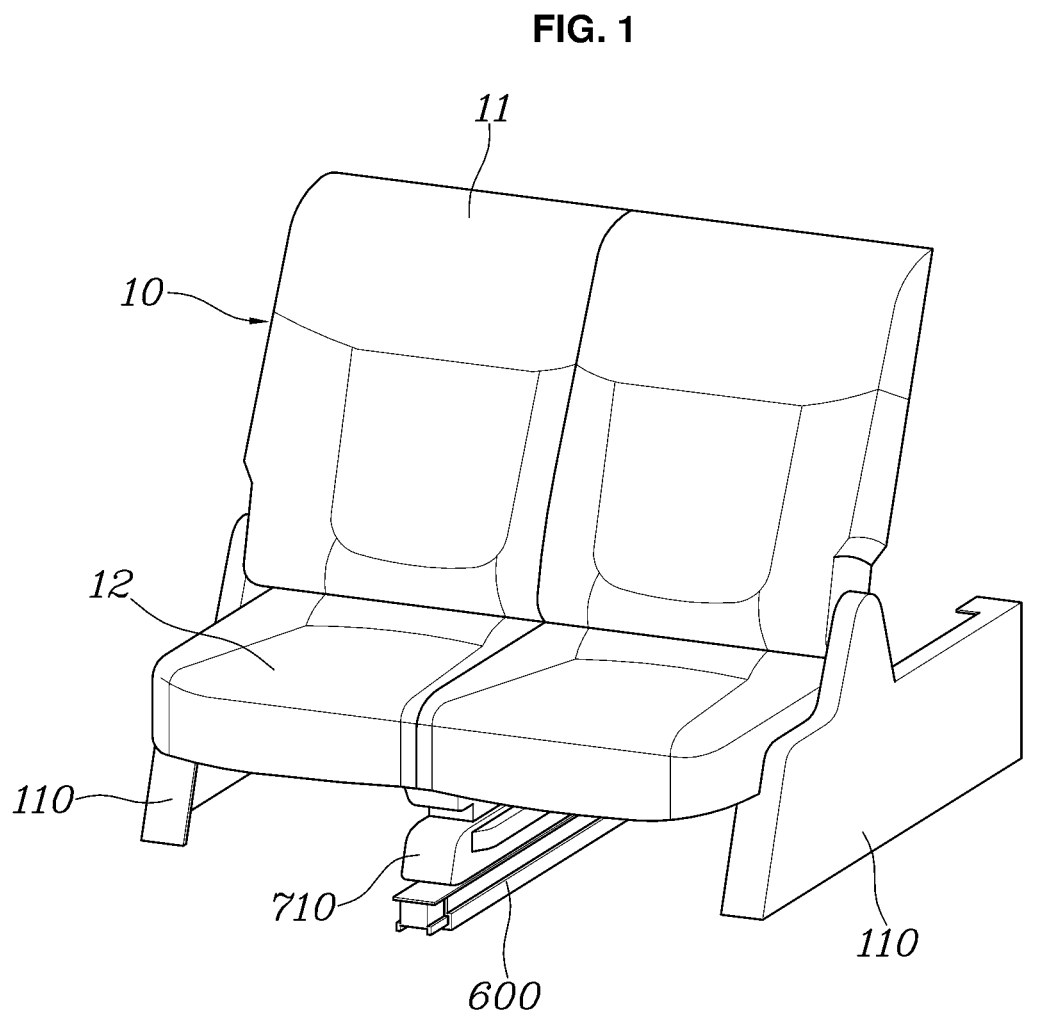

FIG. 1 is a perspective view of a rear seat according to the present disclosure;

Figure 5:
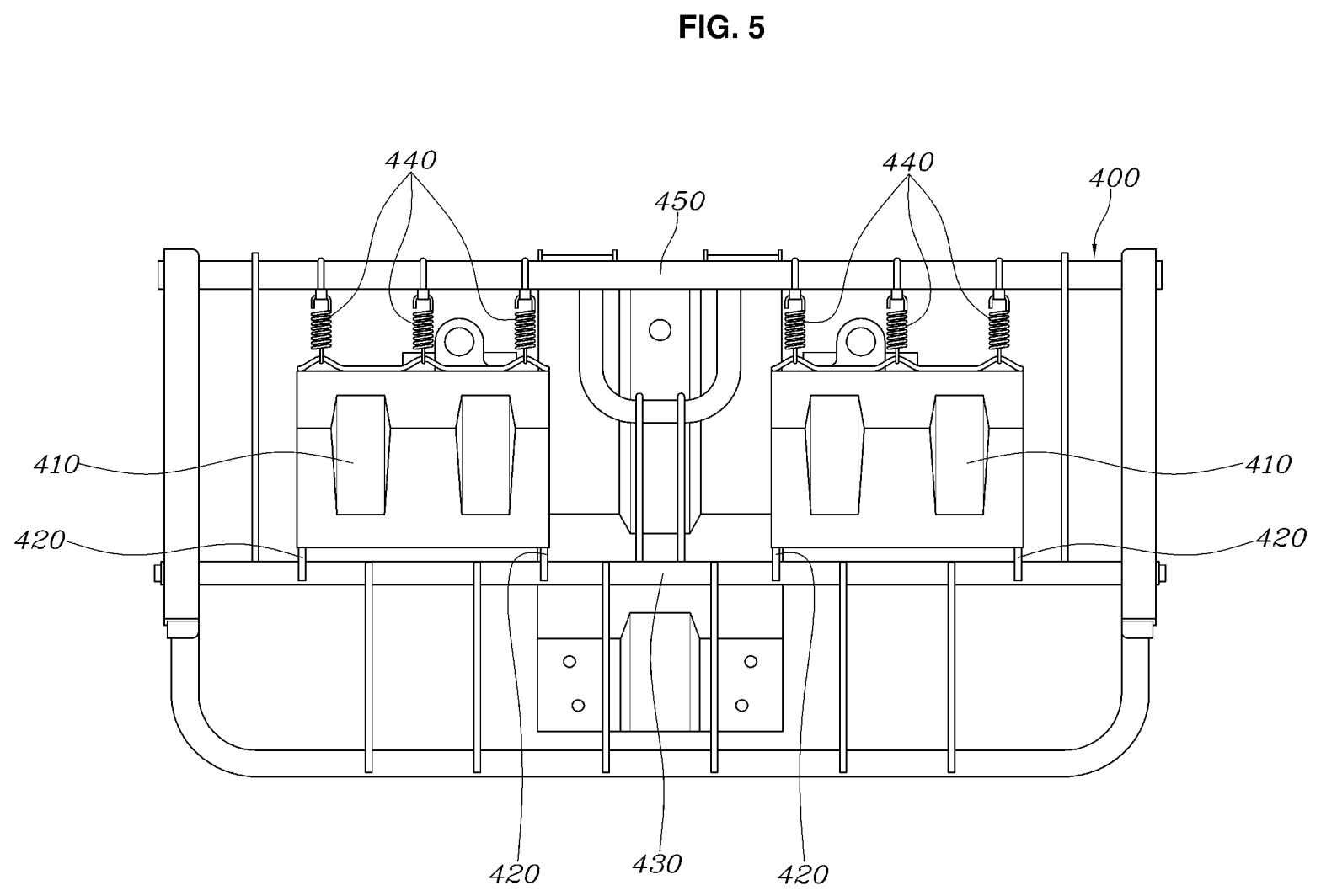

FIG. 5 is a plan view of the cushion frame from above;

DETAILED DESCRIPTION OF THE PREFERRED EMBODIMENTS

Figure 2:
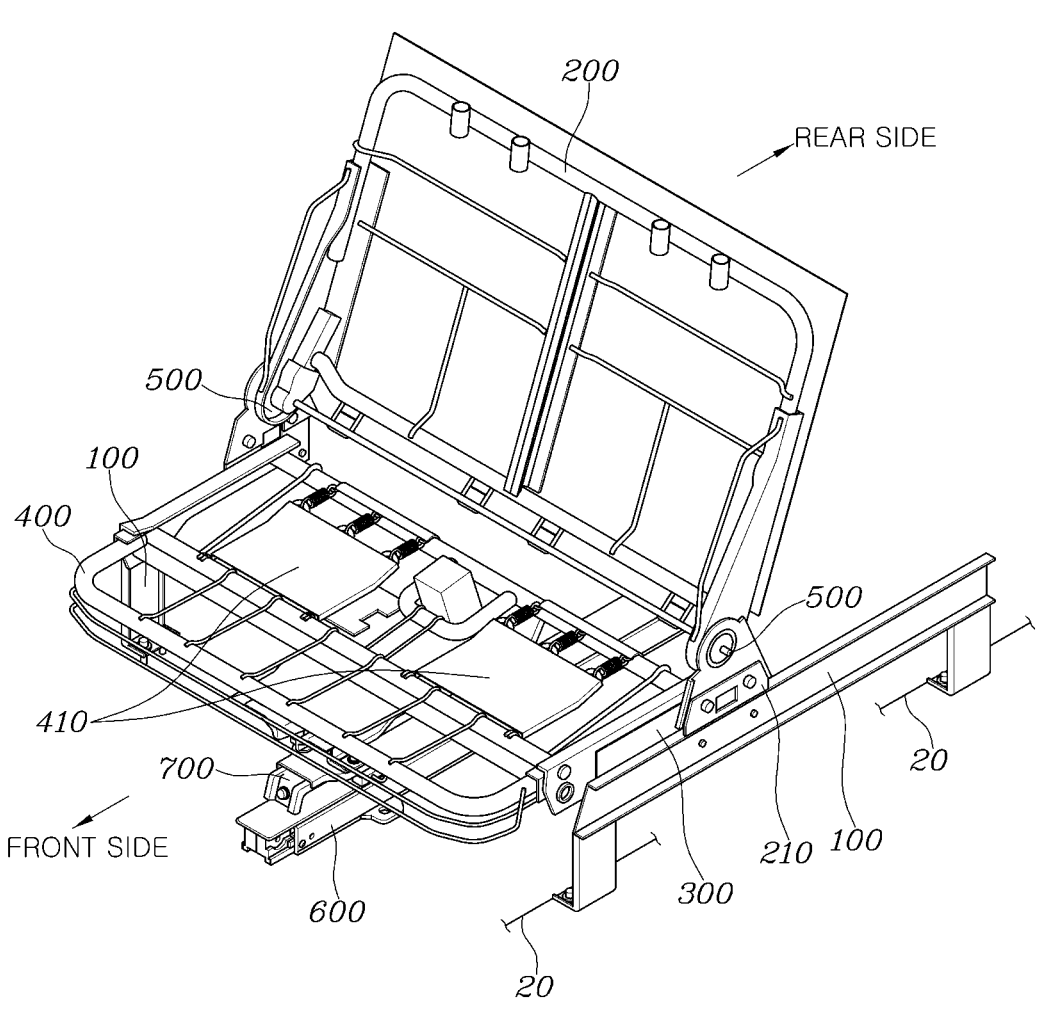
FIG. 2 is a diagram showing a coupled state of a rear seat apparatus according to the present disclosure.
Figure 3:
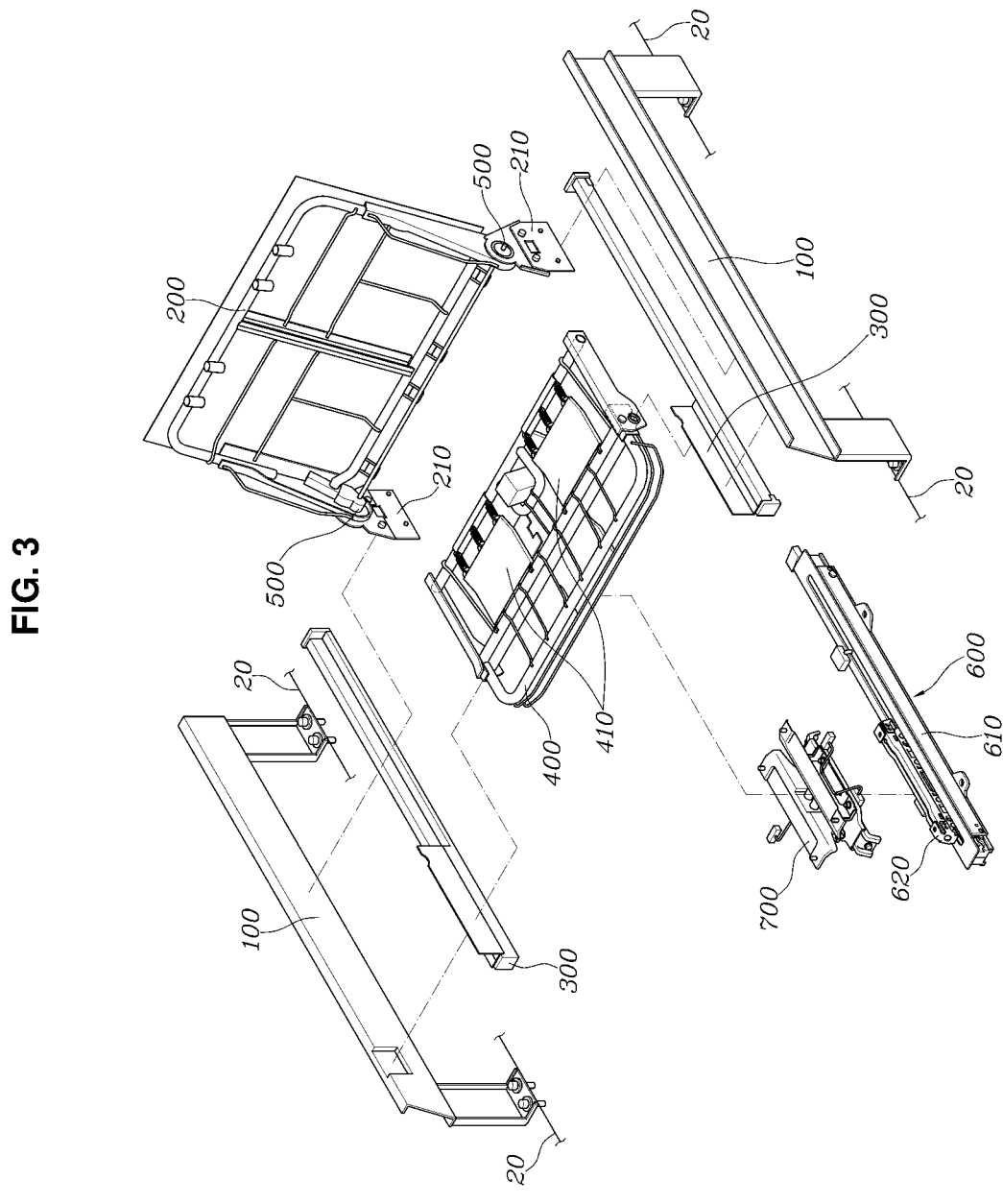
FIG. 3 is an exploded view of the rear seat apparatus.
Figure 4:
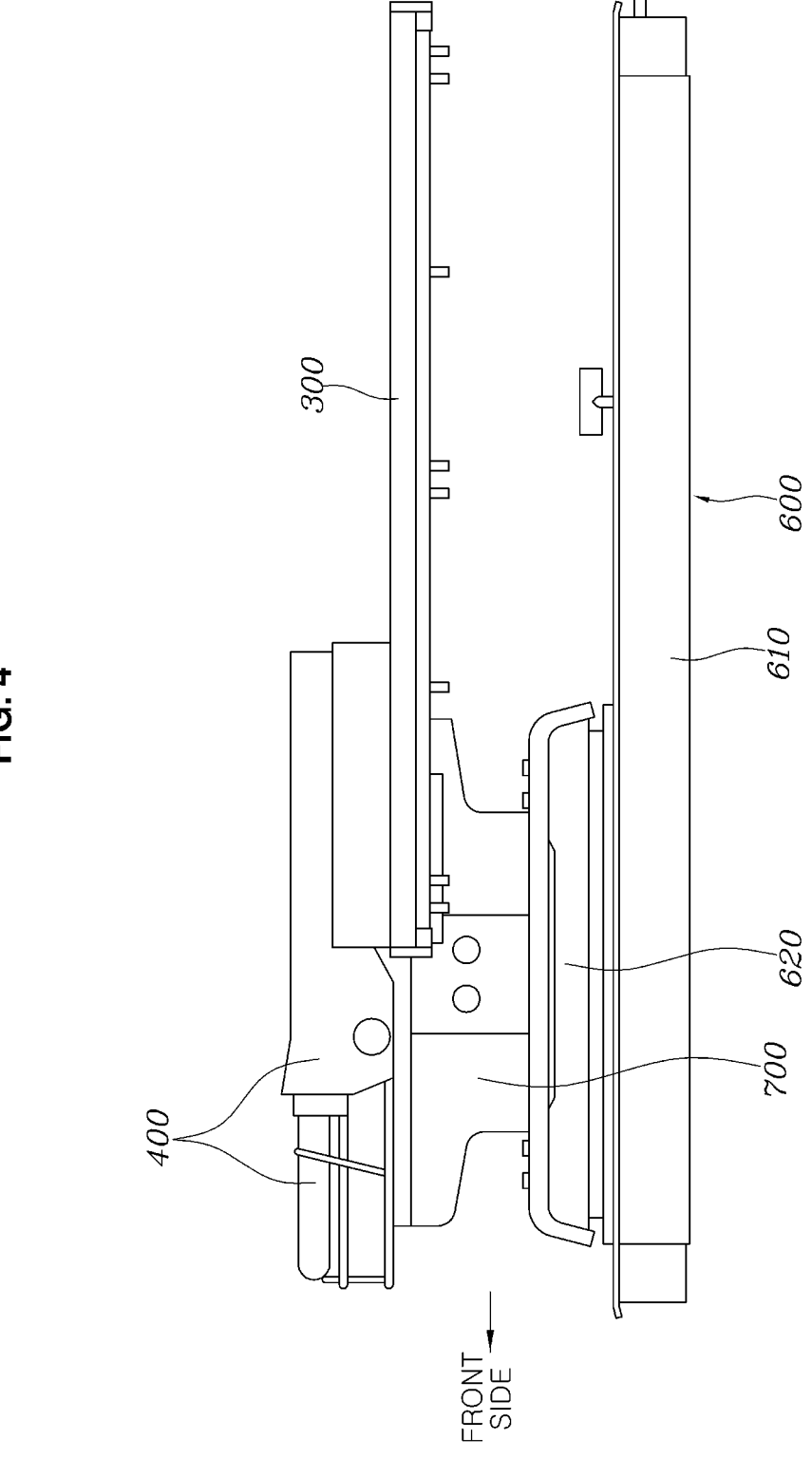
FIG. 4 is a side view of a cushion frame in a state of sliding forwards according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", "portion" and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Reference will now be made in detail to the preferred embodiments of the present disclosure, examples of which are illustrated in the accompanying drawings. Wherever possible, the same reference numbers will be used throughout the drawings to refer to the same or like parts, and redundant descriptions thereof will be omitted.

In describing the embodiments disclosed herein, when it is determined that the detailed description of publicly known techniques to which the disclosure pertains may obscure the gist of the present disclosure, the detailed description will be omitted.

Further, it should be understood that the accompanying drawings are merely illustrated to easily describe the embodiments disclosed in this specification, and therefore, the technical idea disclosed in this specification is not limited by the accompanying drawings. Further, it should be noted that the accompanying drawings include all modifications, equivalents, and substitutes that fall within the spirit and technical scope of the present disclosure.

Meanwhile, in the present disclosure, terms such as "first" and/or "second" may be used to describe various components, but the components are not limited by the terms. The terms are used only for the purpose of distinguishing one component from other components.

When one component is referred to as being "connected" or "joined" to another component, the one component may be directly connected or joined to the other component, but it should be understood that other components may be present therebetween.

On the other hand, when the one component is referred to as being "directly connected to" or "directly in contact with" the other component, it should be understood that no other components are present therebetween.

In this specification, an expression in a singular form also includes the plural sense, unless clearly specified otherwise in context.

In addition, a unit or a control unit included in the names of a motor control unit (MCU), a hybrid control unit (HCU), and the like is a term widely used to refer to a control apparatus (controller) configured to control a specific vehicle function, and does not mean a general functional unit.

In order to control various functions, a controller may include a communication apparatus configured to communicate with another controller or a sensor, a memory configured to store an operating system, a logical command, and input/output information, and one or more processors configured to perform determination, calculation, and the like necessary to control a corresponding function.

Hereinafter, a rear seat apparatus for a vehicle according to a preferred embodiment of the present disclosure will be described with reference to the accompanying drawings.

As shown in FIGS. 1 to 10, a rear seat 10 according to the present disclosure includes a seatback 11 that supports the upper body of a passenger and a seat cushion 12 that supports the lower body of the passenger.

The seatback 11 has a skeleton structure formed by a back frame 200 and the seat cushion 12 has a skeleton structure formed by a cushion frame 400. Each of the back frame 200 and the cushion frame 400 is covered with a pad member made of a cushion material, thereby forming the seatback 11 and the seat cushion 12.

As shown in the drawing, the rear seat apparatus according to the present disclosure includes a pair of side frames 100 spaced apart left and right and fixedly coupled to a vehicle body 20, the back frame 200 fixedly coupled to the left side of one of the side frames 100 and the right side of the other side frame 100, a moving frame 300 coupled to the side frame 100 and configured to slide forwards and rearwards along the side frame 100, and the cushion frame 400 coupled to the moving frame 300, separated from the back frame 200, and configured to individually slide forwards and rearwards independently of the back frame 200.

The vehicle body 20 having the side frame 100 fixedly installed therein may be a rear floor panel, and the lower end of the side frame 100 is fixedly coupled to the vehicle body 20 using a plurality of coupling members such as bolts.

Two side frames 100 are provided and are installed to be spaced apart left and right. Two side frames 100 may be installed parallel to each other in a state of extending in the forward-and-rearward direction.

Mounting brackets 210 are coupled to the lower ends of the left and right sides of the back frame 200, respectively. Each of the mounting brackets 210 is fixedly coupled to a corresponding one of the side frames 100 using a plurality of coupling members such as bolts.

Accordingly, the left side and the right side of the back frame 200 are installed in and coupled to the side frames 100, respectively. Through this configuration, each of the side frames 100 and the back frame 200 are coupled to each other, thereby obtaining an integrated component.

In addition, the moving frame 300 is coupled to the side frame 100, and the moving frame 300 is installed so as to be slidable forwards and rearwards along the side frame 100.

The moving frame 300 is disposed to overlap the side frame 100 in the longitudinal direction of the side frame 100, thereby making it possible to minimize an installation space for the side frame 100 and the moving frame 300. Through this configuration, space utilization may be significantly improved.

The opposite sides of the cushion frame 400 are fixedly coupled to the respective moving frames 300, and the respective moving frames 300 and the cushion frame 400 are coupled to each other, thereby obtaining an integrated component.

When the moving frame 300 slides forwards and rearwards along the side frame 100, the cushion frame 400 coupled to the moving frame 300 also slides forwards and rearwards.

According to the present disclosure, the back frame 200 and the cushion frame 400 are separated from each other without a direct coupling structure therebetween. When the cushion frame 400 slides forwards and rearwards, the back frame 200 is not interlocked with the cushion frame 400. Therefore, the cushion frame 400 individually slides forwards and rearwards independently of the back frame 200.

As described above, the cushion frame 400 is not interlocked with the back frame 200, and the same individually slides forwards and rearwards independently of the back frame 200. Through this configuration, it is possible not only to achieve a simplified configuration and reduce costs as compared with a conventional rear seat configuration in which a seatback is interlocked with a seat cushion, but also to secure seating comfort of a passenger in consideration of the body type of each passenger through individual sliding movement of the seat cushion, thereby having an effect of improving ride quality of a vehicle.

In addition, the rear seat apparatus according to the present disclosure further includes recliners 500 provided on the back frame 200.

The recliners 500 may be provided on the lower left side and the lower right side of the back frame 200, respectively. A recliner bracket connected to the recliner 500 may be coupled to the mounting bracket 210.

Each of the recliners 500 is a component configured to determine the angle of the back frame 200 in the forward-and-rearward direction by rotating the back frame 200 forwards and rearwards. When the recliners 500 are operated, the back frame 200 is rotated individually without being interlocked with the cushion frame 400.

As described above, when the recliners 500 are operated, the back frame 200 is individually rotated in the forward-and-rearward direction independently of the cushion frame 400 without being interlocked with the cushion frame 400. Through this configuration, it is possible not only to achieve a simplified configuration and reduce costs as compared with a conventional rear seat configuration in which a seatback is interlocked with a seat cushion, but also to secure seating comfort of a passenger in consideration of the body type of each passenger through individual rotation of the seatback, thereby having an effect of improving ride quality of a vehicle.

In addition, the rear seat apparatus according to the present disclosure may further include a seat rail 600 located below the cushion frame 400 and installed to extend forwards and rearwards, and a connecting member 700 configured to connect the seat rail 600 to the cushion frame 400.

The seat rail 600 is a component configured to move the cushion frame 400 forwards and rearwards. Further, since the seat rail 600 is electrically operated using a motor, the seat rail 600 has an advantage of adjusting, when the cushion frame 400 moves forwards and rearwards, a sliding movement amount of the cushion frame 400 in the forward-and-rearward direction in consideration of user convenience without adjusting movement steps of the cushion frame 400.

Furthermore, the seat rail 600 is formed of a long rail, the length of which in the forward-and-rearward direction is longer than that of the cushion frame 400, thereby making it possible to expand the sliding movement amount of the cushion frame 400 in the forward-and-rearward direction. Through this configuration, it is possible to secure seating comfort of a passenger in consideration of the body type of each passenger, thereby having an effect of improving ride quality of a vehicle.

The seat rail 600 includes a fixed rail 610 fixed to the vehicle body 20 and formed to extend in the forward-and-rearward direction, and a moving rail 620 coupled to the fixed rail 610, configured to move forwards and rearwards along the fixed rail 610 by power of a motor, and coupled to the connecting member 700.

The seat rail 600 may be located at the middle position in the left-and-right direction of the cushion frame 400 and installed to extend in the forward-and-rearward direction.

The connecting member 700 according to the present disclosure may be formed as a monopost type configured to connect the seat rail 600 to one portion of the cushion frame

400. This configuration has an advantage of sufficiently securing an available space at the bottom of the cushion frame 400.

When the cushion frame 400 is connected to the seat rail 600 only using the monopost-type connecting member 700, a support structure between the cushion frame 400 and the seat rail 600 may not be sufficiently stable. To solve this weak support structure therebetween, the moving frames 300 are coupled to the left and right sides of the cushion frame 400, respectively. Further, each of the moving frames 300 is coupled to a corresponding one of the side frames 100 so as to be slidable and guidable forwards and rearwards along the side frame 100 and, as such, sufficient structural rigidity and strength are achieved. Through this configuration, overall lateral shaking of the rear seat may be eliminated.

The cushion frame 400 according to the present disclosure may include a cushion pan 410 configured to support, when a passenger is seated, the lower body of the passenger, more specifically, the hip portion of the passenger.

At least two cushion pans 410 may be provided, and each of the cushion pans 410 may be installed at a corresponding one of the passenger seating portions. The outer shape of the cushion pan 410 may be formed as a square panel, a circular panel, or a polygonal panel.

The front end of the cushion pan 410 may be fixedly coupled to a center cross bar 430 constituting the cushion frame 400 through a plurality of suspensions 420 each serving as a connecting part, and the rear end of the cushion pan 410 may be connected to a rear cross bar 450 constituting the cushion frame 400 through a plurality of springs 440.

Figure 6:
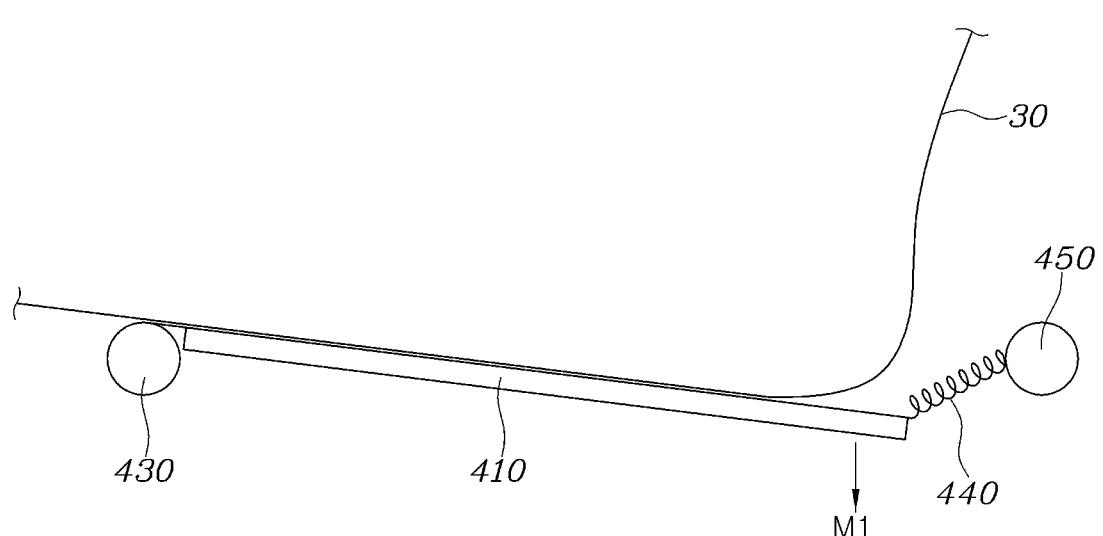
FIG. 6 is a diagram showing a passenger seated on a cushion pan.

Therefore, as shown in FIG. 6, when a passenger 30 is seated on the cushion pan 410, the rear end of the cushion pan 410 moves downwards by tension of the spring 440 (an arrow M1). As a result, the front end of the cushion pan 410 supports the passenger's lower extremities (thighs), thereby having an effect of preventing occurrence of the submarine effect in the event of vehicle collision.

When load of the passenger 30 is removed from the cushion pan 410, the lower end of the cushion pan 410 may be raised again by restoring force of the spring 440 and returned to the initial position of the cushion pan 410.

As shown in FIG. 1, in the rear seat apparatus according to the present disclosure, the side frame 100 and the connecting member 700 may be installed to be covered by a side cover 110 and a connecting member cover 710, respectively.

Figure 7:
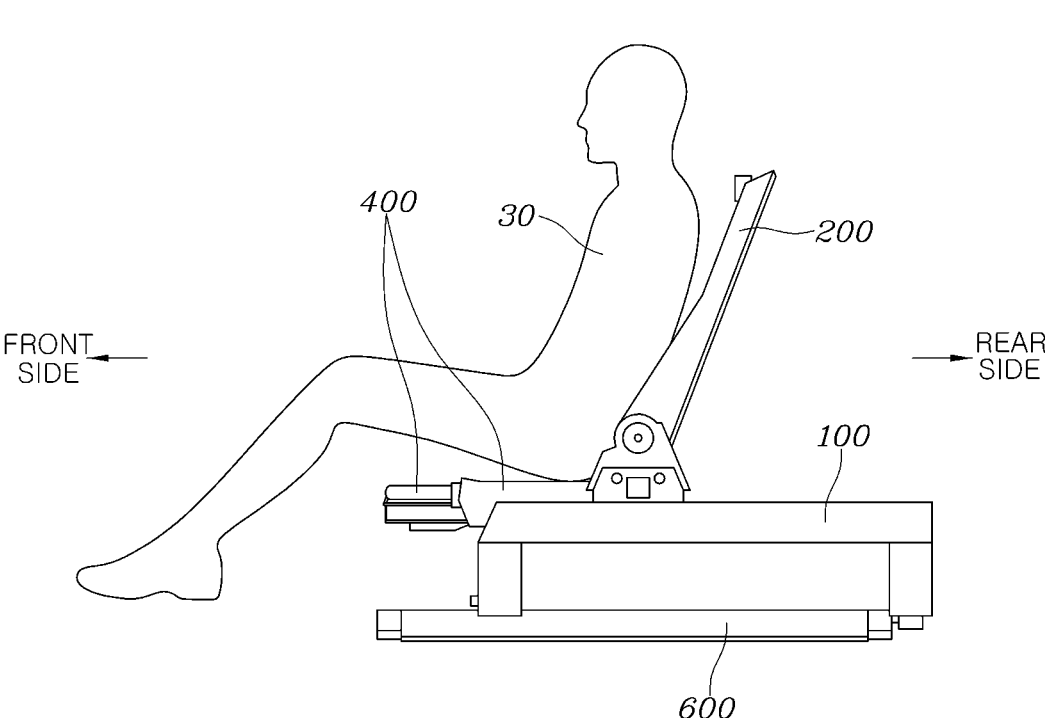
FIGS. 7 and 8 are diagrams respectively showing a front seating state and a rear seating state of the passenger.

As shown in FIG. 7, in the rear seat apparatus according to the present disclosure, when the cushion frame 400 slides forwards so as to protrude forwards with respect to the back frame 200, the passenger 30 is in a front seating state in which the passenger 30 is seated toward the front side.

Figure 8:
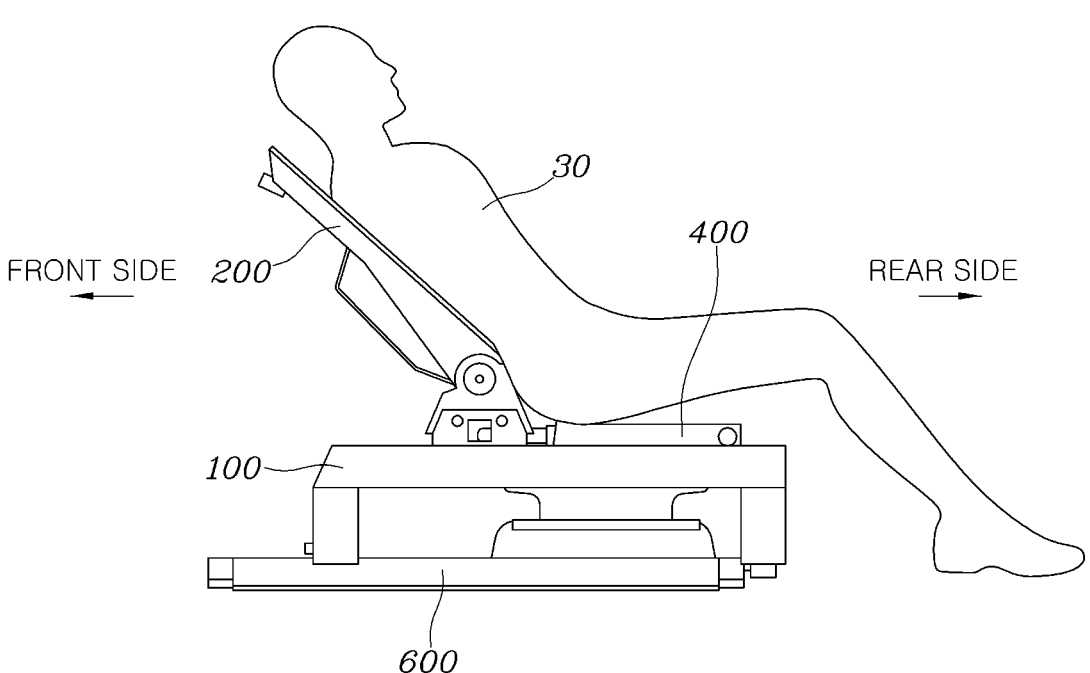

Additionally, as shown in FIG. 8, when the cushion frame 400 slides rearwards so as to protrude rearwards with respect to the back frame 200, the passenger 30 is in a rear seating state in which the passenger 30 is seated toward the rear side.

When the passenger 30 is in the rear seating state as shown in FIG. 8, a comfortable resting mode may be provided to the passenger 30.

As shown in FIGS. 7 and 8, the rear seat apparatus according to the present disclosure is configured to implement the front seating state and the rear seating state of the passenger 30 through sliding movement of the cushion frame 400 in the forward-and-rearward direction. Through this configuration, it is possible to implement a swivel function of the existing rear seat. Particularly, since the swivel function is implementable without a particular swivel device, cost reduction may be achieved. Further, it is possible to use, for other purposes, a space allocated to install an existing swivel device, thereby having an effect of improving space utilization.

Figure 9:
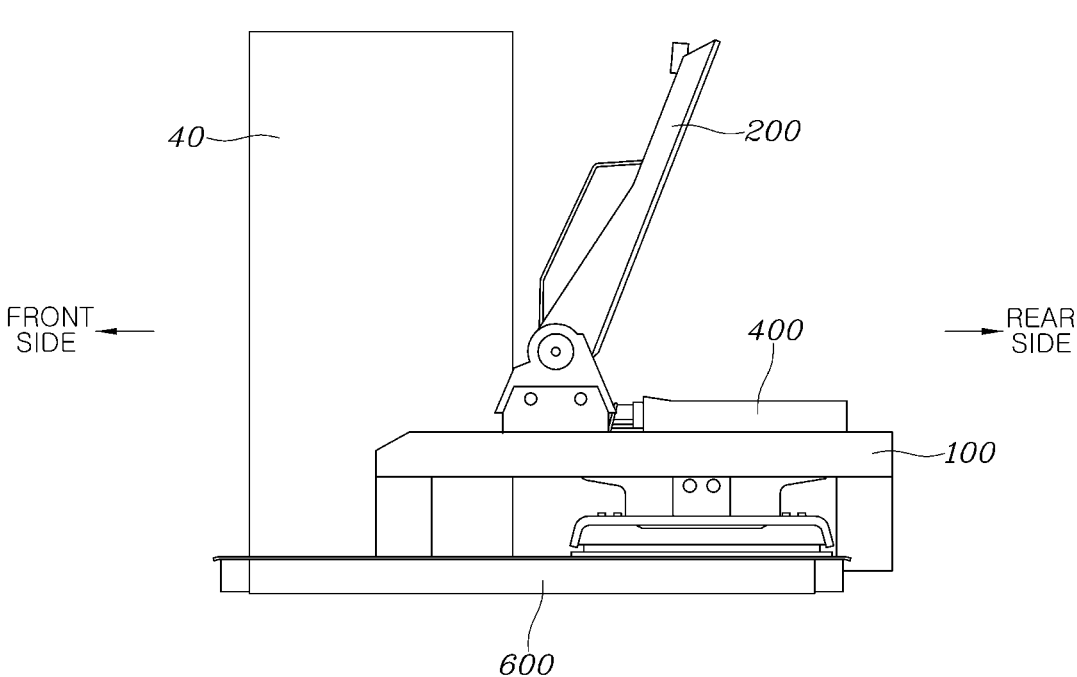
FIGS. 9 and 10 are diagrams showing a state in which an object is loaded in an empty space using the rear seat apparatus according to the present disclosure.

As shown in FIG. 9, in the rear seat apparatus according to the present disclosure, when the cushion frame 400 slides rearwards so as to protrude rearwards with respect to the back frame 200, an object 40 may be loaded in a space secured on the front side of the back frame 200, thereby having an effect of further improving utilization of the interior space of a vehicle.

Figure 10:
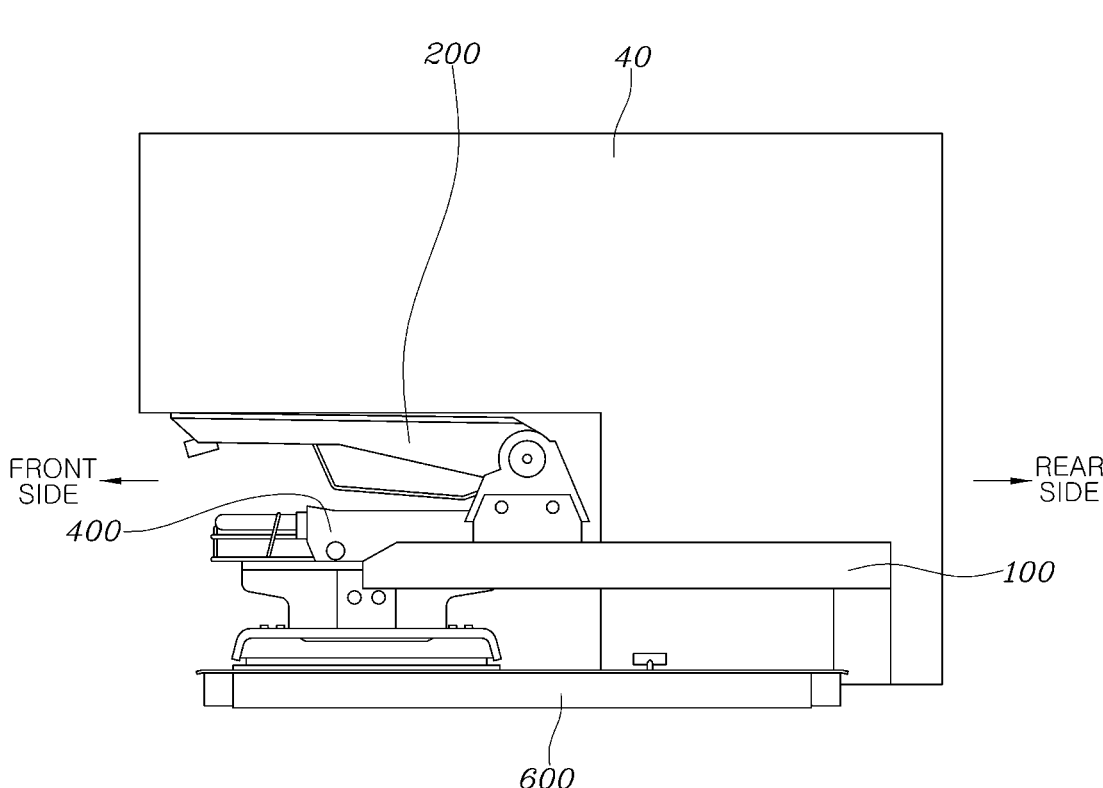

Further, as shown in FIG. 10, in the rear seat apparatus according to the present disclosure, when the cushion frame 400 slides forwards so as to protrude forwards with respect to the back frame 200 and then the back frame 200 is rotated forwards to be folded, the object 40 may be loaded in a space secured on the upper side of the back frame 200 and a space secured on the rear side thereof, thereby having an effect of further improving utilization of the interior space of a vehicle.

As described above, in the rear seat apparatus for the vehicle according to the present disclosure, the back frame 200 is not interlocked with the cushion frame 400 and is individually rotated in the forward-and-rearward direction independently of the cushion frame 400. Further, the cushion frame 400 is not interlocked with the back frame 200, and the same individually slides in the forward-and-rearward direction independently of the back frame 200. Through this configuration, it is possible not only to achieve a simplified configuration and reduce costs as compared with a seat having a configuration in which a seatback is interlocked with a seat cushion, but also to secure seating comfort of a passenger in consideration of the body type of each passenger through individual sliding movement of the seat cushion 12, thereby having an effect of improving ride quality of a vehicle.

In addition, the rear seat apparatus for the vehicle according to the present disclosure is configured to implement the front seating state and the rear seating state of the passenger 30 through individual sliding movement of the cushion frame 400 in the forward-and-rearward direction. Through this configuration, it is possible to implement a swivel function of an existing rear seat. Particularly, since the swivel function is implementable without a particular swivel device, cost reduction may be achieved. Further, it is possible to use, for other purposes, a space allocated to install an existing swivel device, thereby having an effect of improving space utilization.

Furthermore, the rear seat apparatus for the vehicle according to the present disclosure is configured to secure a sufficient loading space for the object 40 on the front and rear sides of the seat through individual sliding movement of the cushion frame 400 in the forward-and-rearward direction, thereby having an effect of further improving utilization of the interior space of a vehicle.

As is apparent from the above description, the present disclosure provides a rear seat apparatus for a vehicle including a back frame not interlocked with a cushion frame and configured to be individually rotated in the forward-and-rearward direction independently of the cushion frame, wherein the cushion frame is not interlocked with the back frame and individually slides in the forward-and-rearward direction regardless of the back frame. Accordingly, it is possible not only to achieve a simplified configuration and reduce costs as compared with a seat having a configuration in which a seatback is interlocked with a seat cushion, but also to secure seating comfort of a passenger in consideration of the body type of each passenger through individual sliding movement of the seat cushion, thereby having an effect of improving ride quality of a vehicle.

Additionally, the rear seat apparatus for the vehicle according to the present disclosure is configured to implement a front seating state and a rear seating state of a passenger through individual sliding movement of the cushion frame in the forward-and-rearward direction. Through this configuration, it is possible to implement a swivel function of an existing rear seat. Particularly, since the swivel function is implementable without a particular swivel device, it is possible not only to reduce costs, but also to use, for other purposes, a space allocated to install an existing swivel device, thereby having an effect of improving space utilization.

Furthermore, the rear seat apparatus for the vehicle according to the present disclosure is configured to secure a sufficient loading space for an object on the front and rear sides of the seat through individual sliding movement of the cushion frame in the forward-and-rearward direction, thereby having an effect of further improving utilization of the interior space of a vehicle.

Although the preferred embodiments of the present disclosure have been disclosed for illustrative purposes, those skilled in the art will appreciate that various modifications, additions, and substitutions are possible, without departing from the scope and spirit of the disclosure as disclosed in the accompanying claims.

What is claimed is:

1. A rear seat apparatus for a vehicle, comprising:
a pair of side frames spaced apart and fixedly coupled to a vehicle body;
a back frame fixedly coupled to a left side of one of the side frames and a right side of another of the side frames;
a pair of moving frames, wherein each of the moving frames is coupled to a corresponding one of the side frames and is configured to slide forwards and rearwards along the side frame; and
a cushion frame coupled to the moving frame and configured to individually slide forwards and rearwards independently of the back frame,
wherein, when the cushion frame slides rearwards so as to protrude rearwards with respect to the back frame, the cushion frame is configured to receive a passenger to be seated toward a rear side.

2. The rear seat apparatus according to claim 1, wherein the pair of side frames are spaced apart left and right.

3. The rear seat apparatus according to claim 1, wherein the cushion frame is separated from the back frame.

4. The rear seat apparatus according to claim 1, wherein the back frame has a recliner that is operable so as to allow the back frame to be individually rotated without being interlocked with the cushion frame.

5. The rear seat apparatus according to claim 1, further comprising:
a seat rail located below the cushion frame and formed to extend forwards and rearwards; and
a connecting member configured to connect the seat rail to the cushion frame.

6. The rear seat apparatus according to claim 5, wherein the seat rail is formed of a long rail and is electrically operated, wherein a length of the long rail in a forward-and-rearward direction is longer than a length of the cushion frame in the forward-and-rearward direction.

7. The rear seat apparatus according to claim 5, wherein the connecting member is formed as a monopost type configured to connect the seat rail to one portion of the cushion frame.

8. The rear seat apparatus according to claim 1, wherein:
the cushion frame comprises a cushion pan configured to support a lower body of the passenger; and
the cushion pan has a front end fixedly coupled to a center cross bar of the cushion frame and a rear end connected to a rear cross bar of the cushion frame through a plurality of springs.

9. The rear seat apparatus according to claim 8, wherein the rear end of the cushion pan is configured to move downward by tension of the springs when the passenger is seated on the cushion pan.

10. The rear seat apparatus according to claim 8, wherein the front end of the cushion pan is configured to support a lower extremity of the passenger.

11. The rear seat apparatus according to claim 1, wherein, when the cushion frame slides forwards so as to protrude forwards with respect to the back frame, the cushion frame is configured to receive the passenger to be seated toward a front side.

12. The rear seat apparatus according to claim 1, wherein the back frame provides, when the cushion frame slides rearwards so as to protrude rearwards with respect to the back frame, a space secured on a front side thereof, wherein the space is usable to load an object therein.

13. The rear seat apparatus according to claim 1, wherein the back frame provides, when the cushion frame slides forwards so as to protrude forwards with respect to the back frame and then the back frame is rotated forwards to be folded, a space secured on an upper side thereof and a space secured on the rear side thereof, wherein the spaces are usable to load an object therein.

14. A vehicle seat comprising the rear seat apparatus of claim 1.

15. A vehicle comprising the rear seat apparatus of claim 1.

* * * * *